(12) United States Patent
Simms et al.

(10) Patent No.: US 11,887,039 B2
(45) Date of Patent: Jan. 30, 2024

(54) SYSTEM AND METHOD FOR MANAGING THE DELIVERY OF GOODS

(71) Applicant: HOME VALET, INC., Vienna, VA (US)

(72) Inventors: John Simms, Mclean, VA (US); John Simms, Jr., Arlington, VA (US); Noel Simms, Jackson, MS (US)

(73) Assignee: HOME VALET, INC., Vienna, VA (US)

( * ) Notice: Subject to any disclaimer, the term of this patent is extended or adjusted under 35 U.S.C. 154(b) by 346 days.

(21) Appl. No.: 16/100,250

(22) Filed: Aug. 10, 2018

(65) Prior Publication Data

US 2020/0051009 A1 Feb. 13, 2020
US 2022/0188762 A9 Jun. 16, 2022

Related U.S. Application Data

(63) Continuation-in-part of application No. 15/897,389, filed on Feb. 15, 2018, now abandoned, and a
(Continued)

(51) Int. Cl.
*G06Q 10/0832* (2023.01)
*B64C 39/02* (2023.01)
(Continued)

(52) U.S. Cl.
CPC ....... *G06Q 10/0832* (2013.01); *B64C 39/024* (2013.01); *G06Q 30/0222* (2013.01); *B64U 2101/60* (2023.01)

(58) Field of Classification Search
CPC ............ G06Q 10/0832; G06Q 30/0222; B64C 39/024; B64U 2101/60
See application file for complete search history.

(56) References Cited

U.S. PATENT DOCUMENTS 3,328,102 A * 6/1967 Stackhouse ............ A47B 47/03
312/108
9,623,553 B1 * 4/2017 Theobald ................... B25J 9/00
(Continued)

OTHER PUBLICATIONS

Microsoft Computer Dictionary, Fifth Edition, Microsoft Press, Microsoft Corporation, Redmond, Washington, 2002, pP. front cover, title page, copyright page, p. 465.*
(Continued)

*Primary Examiner* — Nathan Erb
(74) *Attorney, Agent, or Firm* — Williams Mullen; R. Brian Drozd

(57) ABSTRACT

A system and method for managing the delivery of goods ordered by a customer from a provider thereof to at least one Smart Locked Storage Container (SLSC), each SLSC associated with the customer utilizing: a customer server for ordering and managing the goods to be delivered to the at least one SLSC; a delivery server for managing deliveries of the goods to the at least one SLSC by a delivery agent; a smart communicator for enabling communications between the provider of goods, the delivery server, a signaler and/or the customer server; a controller for controlling the communications; a signaler communicatively connected to the SLSC for transmitting a signal to the SLSC allowing access thereinto by the delivery agent, the customer, and/or an agent of the customer, and at least one of: an element from a list of particular elements.

75 Claims, 24 Drawing Sheets

Related U.S. Application Data continuation-in-part of application No. 15/695,284, filed on Sep. 5, 2017, now Pat. No. 10,643,173, and a continuation-in-part of application No. 15/690,413, filed on Aug. 30, 2017, and a continuation-in-part of application No. 15/677,680, filed on Aug. 15, 2017, now abandoned.

(60) Provisional application No. 62/383,409, filed on Sep. 3, 2016, provisional application No. 62/382,798, filed on Sep. 2, 2016.

(51) Int. Cl.
*G06Q 30/0207* (2023.01)
*B64U 101/60* (2023.01)

(56) References Cited

U.S. PATENT DOCUMENTS

| | | | | |
|---|---|---|---|---|
| 2002/0042665 | A1* | 4/2002 | Kakuta | G06Q 30/06 700/216 |
| 2003/0040980 | A1* | 2/2003 | Nakajima | G06Q 10/08 705/26.8 |
| 2004/0177008 | A1* | 9/2004 | Yang | G06Q 10/08 705/26.1 |
| 2005/0161420 | A1* | 7/2005 | Hardy | A47F 3/002 211/189 |
| 2009/0138374 | A1* | 5/2009 | Cohen | G06Q 40/04 705/26.1 |
| 2009/0141117 | A1* | 6/2009 | Elberbaum | G07C 9/00912 348/14.04 |
| 2014/0254896 | A1* | 9/2014 | Zhou | G06Q 20/3829 382/124 |
| 2016/0063436 | A1* | 3/2016 | Coles | G06Q 10/08355 705/335 |
| 2016/0068357 | A1* | 3/2016 | Bastian | B65G 67/20 414/392 |
| 2016/0187876 | A1* | 6/2016 | Diperna | H04B 17/21 702/81 |
| 2016/0235236 | A1* | 8/2016 | Byers | A47G 29/14 |
| 2016/0275450 | A1* | 9/2016 | Chang | A47G 29/141 |
| 2016/0292709 | A1* | 10/2016 | Lindbo | G06Q 30/0207 |
| 2016/0300187 | A1* | 10/2016 | Kashi | G06Q 10/0832 |
| 2017/0147975 | A1* | 5/2017 | Natarajan | G05D 1/0676 |
| 2017/0320569 | A1* | 11/2017 | Gordon | B64C 39/024 |
| 2018/0122022 | A1* | 5/2018 | Kelly | G06Q 50/12 |
| 2018/0130017 | A1* | 5/2018 | Gupte | G01N 33/00 |
| 2018/0300679 | A1* | 10/2018 | Mahmood | H04L 29/06802 |
| 2018/0365641 | A1* | 12/2018 | Zhu | G06Q 10/0836 |
| 2019/0279151 | A1* | 9/2019 | Felice | H04N 7/185 |
| 2021/0090017 | A1* | 3/2021 | Reiss | G06Q 10/0833 |

OTHER PUBLICATIONS

PR Newswire, PostalVision 2020/4.0 to Explore New Delivery Models and Digital Innovations in a Rapidly Expanding E-Commerce World: Worldwide Experts to Discuss Future of Delivery at Fourth Annual PostalVision 2020 Conference, April 10-11, in Washington, D.C. Key sponsors include eBay, DHL, Accenture, Pitney Bowes.*

* cited by examiner

SYSTEM AND METHOD FOR MANAGING THE DELIVERY OF GOODS

BACKGROUND OF THE INVENTION

Home delivery of ordered/purchased goods comprises a multi-hundred billion dollar market.

The home food delivery market alone is estimated to be over $200 billion. However, theft is common. Nearly 11 million U.S. homeowners have had at feast one package stolen within the past year.

Existing Band-Aid type solutions to the theft problem have turned out to be easily side-stepped by determined thieves. Recent "solutions", such as, installing smart lock+ camera combinations accomplish secure delivery of the ordered/purchased goods only by allowing entry into the interior of the building to which delivery is being made, have very low customer acceptance as being too invasive.

On-demand delivery systems requiring tight time windows for delivery only when the delivery site is occupied have proven to be logistically difficult and expensive. Delivery solutions which are exclusive and brand-specific do not reflect customer buying habits and result in bad customer experiences. Present day "Lockers" still require the consumer to travel to a pick-up location, thereby defeating the purpose of the proposed of perishable goods without the considerable expense of packing materials and the concomitant waste.

U.S. Pat. No. 6,933,832 describes a system and method which enables the delivery, and safe and secure receipt of purchased items or other goods, at an unattended site.

The patented method and system enables the delivery of at least one purchased or ordered item to a locked storage container, associated with a corresponding customer, the method comprising, following the purchase or order of the at least one item, determining the availability of the locked storage container to receive the delivery at one or more times, identifying a time interval during which the delivery can be made, and sending to the locked storage container an access signal allowing a delivery agent access to the locked storage container only during the time interval for delivery thereto of the at least one item.

Non-provisional patent application Ser. No. 15/897,389 describes a system and method, hereinafter referred to collectively and individually as HomeValet or HV systems and methods, which satisfies the need for secure delivery and provides a better customer experience at less cost. Disclosed therein is a system for managing the delivery of goods ordered by a customer from a provider thereof to at least one Smart Locked Storage Container (SLSC), each SLSC associated with the customer comprising:
  a customer server for ordering and managing the goods to be delivered to the at least one SLSC;
  a delivery server for managing deliveries of the goods to the at least one SLSC by a delivery agent;
  a smart communicator for enabling communications between the provider of goods, the delivery server, a signaler and/or the customer server;
  a controller for controlling the communications; and
  a signaler communicatively connected to the SLSC for transmitting a signal to the SLSC allowing access thereinto by the delivery agent, the customer, and/or an agent of the customer.

Also described therein is a method for managing the delivery of goods ordered by a customer from a provider thereof to at least one SLSC, each SLSC associated with the customer comprising utilizing:
  a customer server to order and manage the goods to be delivered to the at least one SLSC;
  a delivery server to manage deliveries of the ordered goods to the at least one SLSC by a delivery agent;
  a smart communicator to enable communications between the provider of goods, the delivery server, a signaler and/or the customer server; a controller to control the communications; and
  a signaler communicatively connected to the SLSC to transmit a signal to the SLSC allowing access thereinto by the delivery agent, the customer, and/or an agent of the customer.

Finally, the application discloses a non-transitory recording medium which is readable by a device such as a processor, computer, a machine, or the like and on which a program for utilizing the above-described HomeValet (HV) system to carry out the above-described HomeValet (I-IV) method is recorded. In this case, a recording medium that is readable by a computer or the like refers to a recording medium which stores information such as data and programs by an electric action, a magnetic action, an optical action, a mechanical action, or a chemical action and which can be read by a computer or the like.

SUMMARY OF THE INVENTION

The present invention relates to improvements in the above-described HV methods, systems and non-transitory recording media for operating the HV systems and performing the HV methods.

One embodiment of the present invention relates to an improvement in the HV system comprising at least one server processor enabled to conduct a transaction between the server and customer for the purchase, order, and/or delivery of goods to the SLSC as part of an automated mobile transaction performed with a mobile device, Another embodiment of the invention is predicated on the unexpected discovery that the HV method and system can be vastly improved by enabling the delivery to be made by an unmanned delivery aircraft; i.e., a drone aircraft.

An additional embodiment of the invention concerns an improvement in the HV method and system wherein the at least one SLSC is associated with a central logistics management platform which includes a security camera, associated with the at least one SLSC.

A further embodiment of the invention relates to a still further improvement in the HV system and method wherein delivery is associated with a system which provides the customer with discounts, incentives, rewards and/or other advantages based on the loyalties of the customer to the provider.

A still further embodiment of the invention relates to another improvement in the HV system and method wherein delivery is accomplished robotically and with a driverless vehicle.

An additional embodiment of invention relates to a still further improvement in HV method and system wherein delivery is made to at least one of plurality of interlocking SLSCs.

Another embodiment of the present invention concerns an improvement of the HV method and system, the improvement comprising the incorporation therein of a method or system, respectively, for preparing invitations to bid for delivery of the ordered or purchased goods; distributing, receiving, and evaluating the bids from a pool of delivery agents in an auction; and selecting a delivery agent.

DESCRIPTION OF THE DRAWINGS

FIG. 9 depicts a flow chart illustrating an embodiment of the invention.

DETAILED DESCRIPTION OF THE INVENTION

Figure 1:
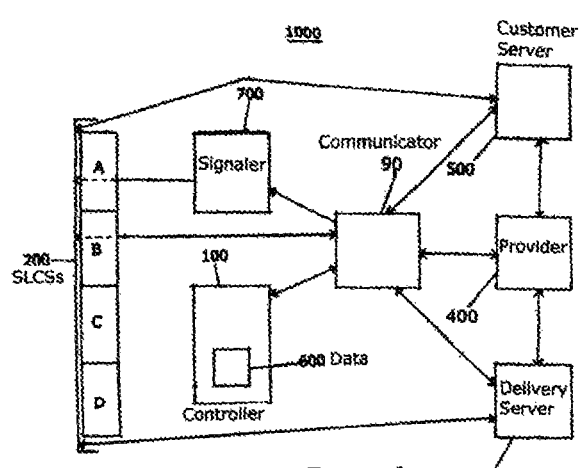
FIG. 1 is a block diagram illustrating an embodiment of the system according to the invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The HV method and system and the non-transitory recording media which are improved by the various embodiments of the invention significantly enhances the delivery to and the receipt of goods or other items to and from a SLSC, which includes but is not limited to ordering or purchasing goods, scheduling and tracking deliveries, receiving deliveries of the goods, making and processing payment, inventorying items scheduled for delivery and items delivered and making information about deliveries available to the deliverer and/or customer.

The system, method and program improved by the invention, referred to herein in their entirety as HomeValet [HV], relate to a delivery platform for the secure, unattended receipt of goods delivered by any provider thereof and delivery agent to a SLSC located at any suitable venue, such as, for example, the home or office.

Goods delivered to most homes or other venues today are left unattended at the front door vulnerable to elements and theft. As consumers come to rely on e-commerce to supply groceries and everyday consumables, in addition to clothing and specialty items, and as the frequency and cumulative value of deliveries increases, delivery problems due to damage, theft and inconvenience will become a major concern of online consumer and retailers and an impediment to growth.

HomeValet integrates a platform for consumers and delivery agents, a network and a SLSC at a venue for the unattended, local delivery of goods, groceries, prepared foods, prescription drugs, electronics, alcoholic beverages, clothing, gifts and more. Deliveries will be made to the SLSC at any time without consumers inconvenienced by inconvenient delivery time windows and retailers burdened with the costs of compressed delivery schedules, protective delivery packaging, and package re-delivery, damage and returns.

HomeValet may become an integral complement to every smart home and as necessary as a home security system and at about the same monthly cost, and less than a high speed Internet connection or cable tv subscription. Depending on the consumers choice of loyalty program. HomeValet may be substantially free to the consumer.

Retailers will experience savings because of less spoilage, damage and theft, less expensive packaging, streamlined delivery with no multiple attempts and lower cost delivery cost of returns. A better customer experience and an expanding customer audience in home delivery will be the greatest gain for customer and retailer.

HomeValet is retailer, delivery service and SLSC agnostic. Access will be provided to e-commerce retailers, brick and mortar retailers [Jet.com, Amazon, Ebay, Peapod, CVS, Macys, Wayfair, Grubhub, Williams Sonoma, and the like], and national, regional and local delivery carriers [FedEx, UPS, USPS, Doordash, Instacart, Uber, Postmates, Amazonlogistics, and the like]. Typical of manufacturers of SLSC would include Kenmore, Maytag, Viking, Samsung, LG, Whirlpool, Coleman, Yeti, and the like.

Those provided access will receive a mobile app (or APIs), scheduling software, and permissions on request to access SLSCs to make deliveries. Retailers with a local or regional presence, by employing local carriers with access to the HomeValet system, will be able to compete with existing systems for ordering and delivering goods, without the high cost of developing their own delivery capability. One option for HomeValet is to offer a crowd sourced, Uber-like, system as an alternative. A copending U.S. patent application describes a real-time auction of scheduled deliveries to participating crowd sourced drivers.

HomeValet will provide connectivity and functionality to appliance manufacturers who may build, install, and market their branded version of SLSC. These may comprise appliances in a wide variety of sizes, facades, and capabilities, some integral to the home and some standalone. Manufacturers will be able to innovate and differentiate design to address physical requirements and market segments as is presently accomplished with refrigerators, stoves, or any major home appliance.

Having access to HomeValet's scheduling and delivery system and SLSC appliance provide a competitive advantage for retailers and delivery couriers. HomeValet will enable appliance manufacturers and retailers to provide new products and an enhanced income stream, such as, for example, income on every package delivered, on the licensing of connectivity to appliance manufacturers, on retailer and delivery agent subscriptions to integrate with the HomeValet system, and, in some cases, the rental or purchase of SLSCs to homes and offices.

HomeValet is predicated on the unexpected discovery that methods and systems for the delivery of purchased or ordered items to a SLSC can be vastly improved by managing the delivery utilizing the method, system and computer readable non-transitory recording media described herein.

The system, method and program are predicated on the availability of at least one Smart Locked Storage Container (SLSC) which is accessible by means of an identifier which unlocks an entry door to the interior of the SLSC.

FIG. 1 is a block diagram illustrating a system 10 for managing the delivery of goods ordered from a provider thereof to a SLSC according to the present invention.

As shown in FIG. 1, the system 10 includes a smart communicator 90, controlled by controller 100, for internetworking and communicating with a delivery server 300, a provider of ordered goods 400, and a customer server 500, and a system of SLSCs 200, which may comprise individual SLCSs A-F, in a form of one or more short messages (SMS messages) or electronic mail (e.g., e-mail).

Upon receiving the one or more SMS messages or e-mails containing information on the articles ordered, the controller 100 stores information relating to the ordered articles, the provider, the customer, the SLSC, and delivery agent in a database 600.

The controller 100 preferably incorporates a computer and controls the overall operation of the system 10, including scheduling the delivery of goods, managing the communications via the smart communicator 90 between the delivery server 300, the customer server 500, the provider 400 and the signaler 700. These communications may take the any convenient forms; e.g., wired or wireless communication links.

Signaler 700 sends a signal to the designated SLSC [A-F] allowing access thereinto by the delivery agent, customer, or agent of the customer. The communicator 90 notifies the customer server 500, by transmitting an arrival message thereto when the goods are delivered into the SLSC.

Figure 2:
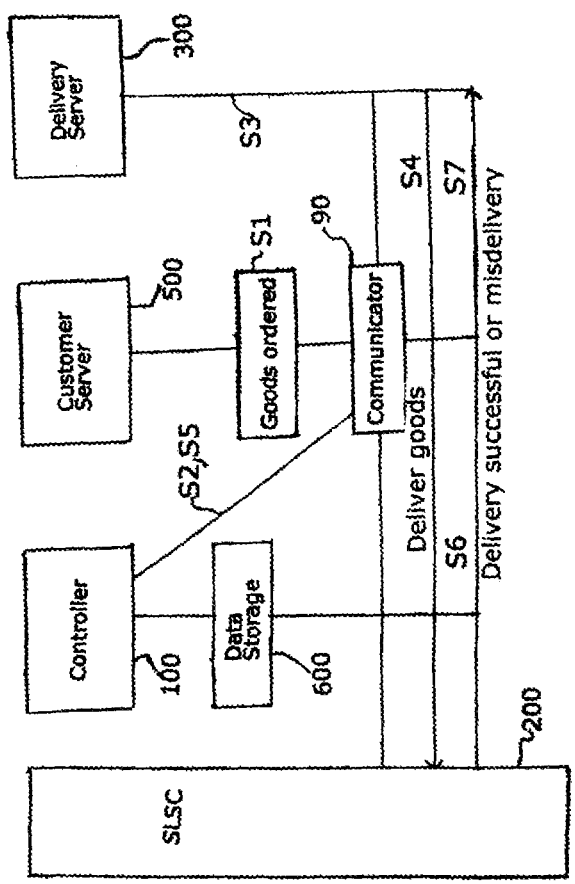
FIG. 2 is a flow diagram illustrating embodiments of the method according to the invention
Figure 8:
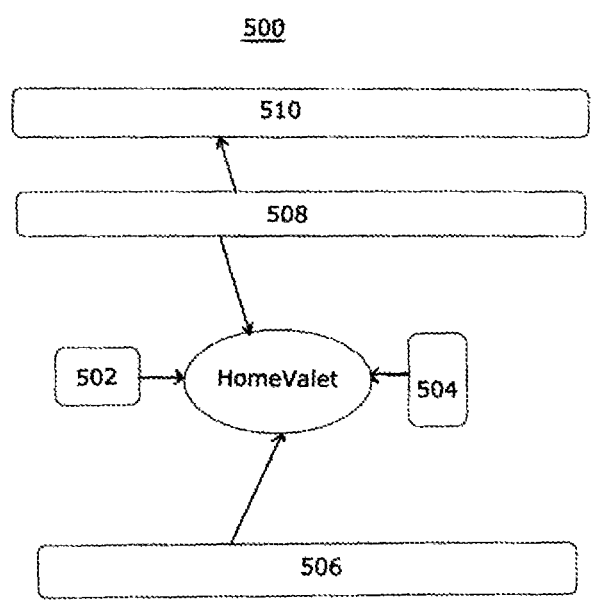
FIG. 8 is a block diagram illustrating an embodiment of the system of the invention.

FIG. 2 is a flow diagram illustrating a method for utilizing the system of FIG. 8 to manage deliveries of ordered goods to a SLSC, according to the present invention. Referring to FIG. 2, the customer server 500 accesses the provider via communicator 90 to order and pay for goods at step S1. The communicator transmits information regarding the ordered goods to controller 100 at step S2, which schedules delivery of the ordered goods to the customer. Upon completing the scheduling process, the controller sends delivery instructions to the delivery server via smart communicator 90 at step S3. The delivery server provides instructions to the delivery agent (not shown) for delivery of the ordered goods and communicates with signaler 700 (shown in FIG. 8), to allow access to the appropriate SLSC by the delivery agent, and the customer or an agent of the customer.

The ordered goods are then delivered to the SLSC at step S4. Information concerning the goods delivered at step S4 is also conveyed to controller 100 via the smart communicator 90 at step S5. The controller then compares the information received from the delivery server with the original order stored in data storage 800. If the comparison evidences identity between the two pieces of information, the controller forwards to the customer server 500 an indication that the delivery was successful at step S6. If the comparison shows a discrepancy between the ordered goods and the goods delivered, the controller sends a misdelivery message to the customer server 500 at step S7.

It will also be understood by those skilled in the art that the system and method of the invention may also be employed to allow the customer to return misdelivered goods to the provider by simply reversing the above described process.

Figure 3:
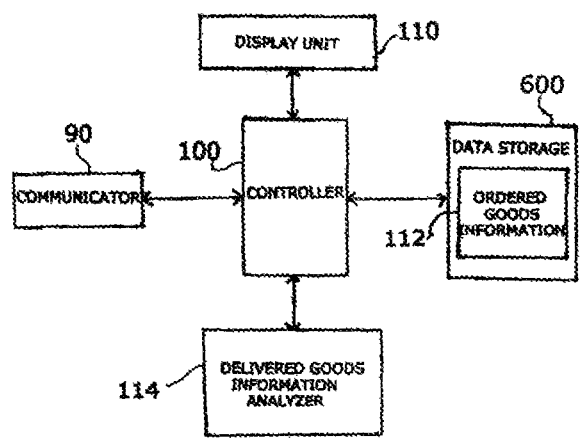
FIG. 3 is a block diagram illustrating an embodiment of the controller in the system according to the invention.

FIG. 3 is a block diagram illustrating the controller in more detail. As shown in FIG. 3, the controller 100 includes a display device 110, smart communicator 90, a data storage 600, an ordered goods information unit 112, and a delivered goods information analyzer 114. The display unit 110, displays the operation status of the various units operated, managed, and controlled by controller 100. The controller also compares the information concerning the ordered good with the information relating to the delivered goods. If the two are in agreement, a message of successful delivery is sent to the customer server 500, as described above. If the two pieces of information are not in accord, a message of mis-delivery is forwarded to the customer server 500, again as described above.

Figure 4:
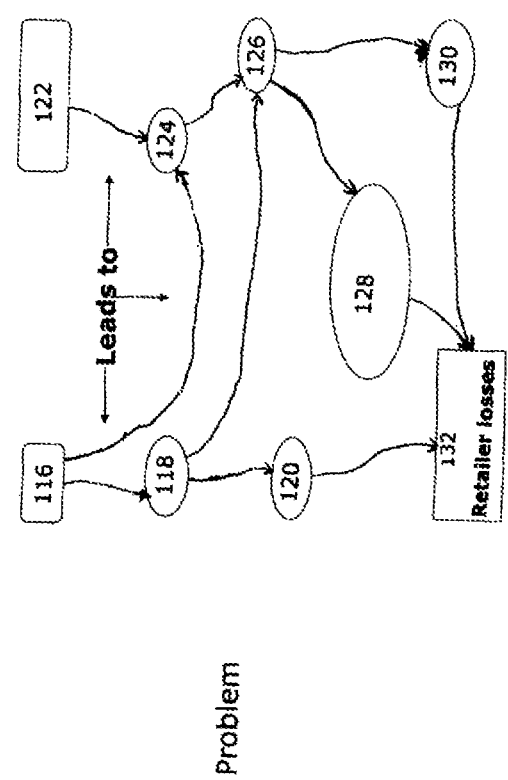
FIG. 4 is a flow diagram illustrating the disadvantages of the systems of the prior art.

FIG. 4 is a flow diagram that illustrates the problematic disadvantages associated with the models/systems of the prior art. [Each of the arrows ( ⸺⸺⸺➤ ) depicted in the diagram is an indication of what the numbered disadvantages of the prior art lead to]. Insecure, outdoor, remotely located delivery sites 116 lead to damaged and stolen goods 118, as well as the necessity for costly and inconvenient returns 124 of ordered/purchased goods. The sites 116 typical of the prior art also lead to replacement costs 120 of the damaged or stolen goods 118.

The inconvenient, costly and largely inefficient delivery scheduling and coordination steps required by the prior art lead to costly and inconvenient returns 124 of ordered/purchased goods, which, in turn, leads to consumer inconvenience 126, as well as a disincentive for the purchaser 130 to utilize the seller/provider of goods and a loss of brand loyalty and poor brand experience 128.

The above detailed disadvantages ultimately lead to considerable losses 132 to the seller/provider of the ordered goods.

Figure 5:
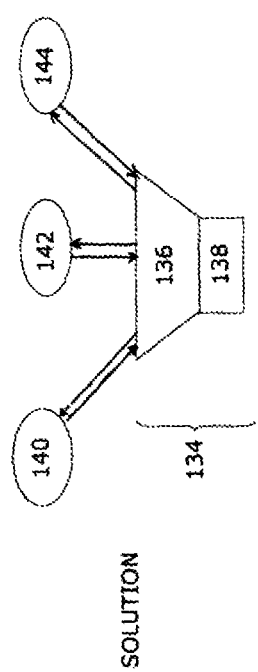
FIG. 5 is a flow diagram illustrating embodiments of the method according to the invention which ameliorate the disadvantages illustrated in FIG. 12

FIG. 5 is a flow diagram that illustrates embodiments of the invention which ameliorate the above described problematic disadvantages associated with the models/systems of the prior art. [Again, each of the arrows ( ⸺⸺⸺➤ ) depicted in the diagram is an indication of to what the numbered solutions lead].

The centralized base platform/host system 136 which is powered by HomeValet 134 communicates directly with the seller/provider 140 of goods, which are bought/ordered by the consumer 144. The platform, upon completion of the buying/ordering process, immediately communicates with the carrier 142 of the ordered/purchased goods to deliver same to the SLSC 138.

Figure 6:
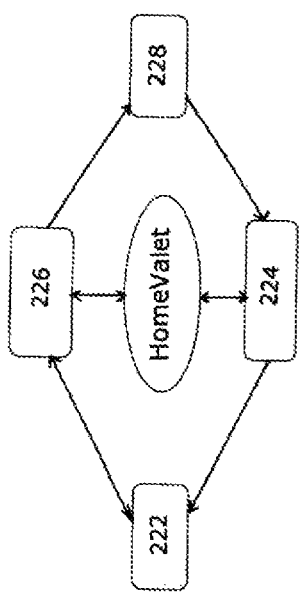
FIG. 6 is a flow diagram illustrating embodiments of the method according to the invention.

FIG. 6 is a flow diagram that illustrates further embodiments of the invention. [Each of the arrows (~~~~~~~~~~→) depicted in the diagram is an indication of to what can be achieved among and between the numbered components].

Depicted are the centralized HomeValet platform System, the consumer/customer 224, the supplier of goods 222, the carrier of the purchased/ordered goods 226 and the SLSC 228.

The supplier of goods 222 provides purchase and delivery information to HomeValet, which provides this information to prospective purchasers/orderers of goods to customer 224, and thereafter monitors and manages deliveries from the carrier 226 through, for example, a mobile app; it being understood by those skilled in the art that any convenient app may be employed to accomplish the goals of the invention. The supplier of goods 222 may also communicate directly with carrier 226 to exchange, for example, delivery information and tracking statuses. HomeValet may also directly communicate with carrier 226 to provide authorization for the delivery and exchange other information required to complete the delivery process. Carrier 226 communicates directly with SLSC 228 for purposes of accessing the latter to deliver the goods and provide information thereto which may be required. The customer 224, upon retrieval of the goods from SLSC 228, may also receive from SLSC 228, further information as to the condition of the container such as, for example, that additional goods are present therein for retrieval or that it is empty. HomeValet may also exchange information with SLSC 228 such as, for example, authorization for access by carrier 226. The latter may also update HomeValet as to the status of the delivery. Customer 224 and supplier 222 may also exchange information such as, for example, loyalty/reward benefits, discounts, auto-refills and the like.

Figure 7:
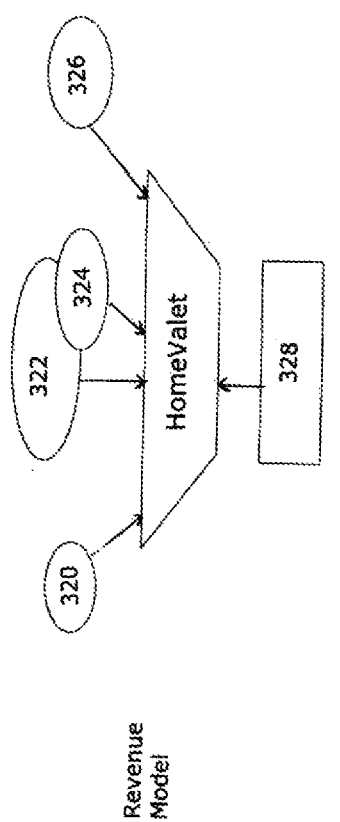
FIG. 7 is a flow diagram illustrating a revenue model of embodiments of the method according to the invention.

FIG. 7 is a flow diagram that illustrates an exemplary revenue model achievable by an embodiment of the invention. [Each of the arrows (~~~~~~~~~~→) depicted in the diagram is an indication of the direction of flow of revenue]. Fees paid by the supplier of ordered/purchased goods 320 and the carrier thereof 322, which may include a per item fee 324 flow to HomeValet. The customer 326 also may pay a subscription fee to HomeValet. Finally, the manufacturer of the SLSC may also pay a license fee to HomeValet.

In its simplest form, the crux of the invention resides in a centralized host platform/system communicably coupled to the above herein described servers via an application programming interface (API) such as a local area network (LAN), wide area network (WAN), the Internet or others.

FIG. 8 is a block diagram of the immediately above described system 500, wherein the centralized HomeValet system is in communication with and manages each of the internal platform APIs 502, the SLSC API 506, the customer server 504, which is depicted as a mobile app, but, as will be understood by those skilled in the art may comprise any convenient server and corresponding app/API. HomeValet also communicates with the carrier server API 508 and the supplier of ordered/purchased goods 510.

The improved invention enables a customer to interact with automated systems via a mobile device to transact the purchase, order, and/or delivery of goods to the smart locked storage containers. The components of the system are implemented in non-transitory computer-readable storage medium for execution on one or more processing devices that are configured to execute the components. The components are also enabled to operate and communicate with one another over a network. The network can be wired, wireless, or a combination of wired and wireless.

Figure 9:
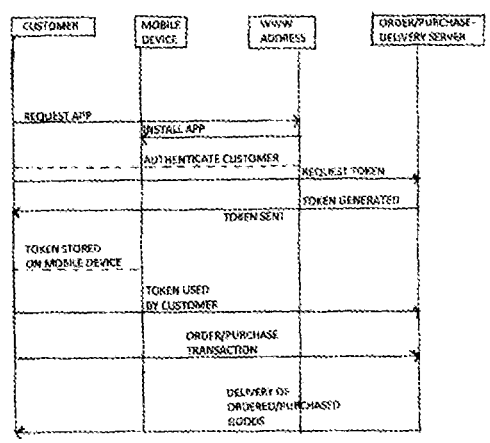
FIG. 9 is a block diagram of an embodiment of the invention employing a mobile device.

The relationship of the components shown in the FIG. 9 are presented for illustrative purposes. Accordingly, other arrangements and interactions of the components are possible without departing from the scope of the invention. The improved method of the invention enables sellers/providers of goods and their customers to conduct purchases, orders of goods via secure mobile transaction services, and/or manage the delivery thereof to a SLSC. Thus, the invention permits a customer to register a mobile device on the sellers website, for example, which then submits an encrypted token to the customer that enables the device to utilize the token for the sale, purchase, order, and/or delivery transaction.

Another embodiment of the present invention is predicated on the unexpected discovery that the HV method and system is vastly improved by associating the delivery with a network platform which enables delivery utilizing unmanned aircraft.

Figure 10:
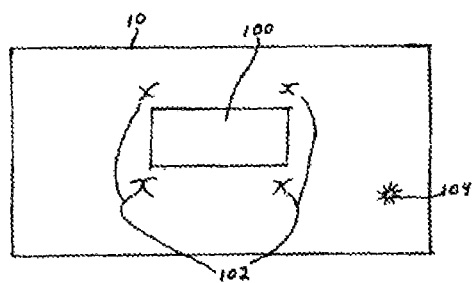
FIG. 10 is an elevational view of the top of a storage container of the invention equipped with a loading dock for an unmanned aircraft delivery agent

FIG. 10 illustrates the method and system of the present invention, which comprises an improvement over the prior art system and method described above. Depicted is the top of a storage container 10, in which is positioned a hatch 100, ports 102 for docking with an unmanned delivery aircraft, and fixture 104 for receiving the hereinbefore described access signal from the unmanned aircraft.

Figure 11:
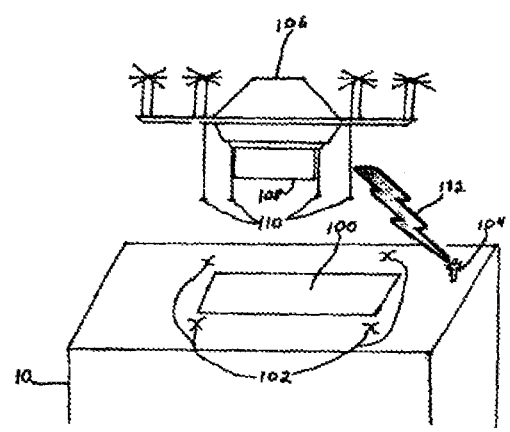
FIG. 11 is an elevational view of a side of the storage container of the invention docking with an unmanned aircraft delivery agent

FIG. 11 depicts the storage container 10 shown in FIG. 10 being approached by unmanned delivery aircraft 106 carrying the cargo to be delivered 108. The aircraft is fitted with elements 110 for docking with ports 102 (FIG. 8), after sending signal 112 to receiving fixture 104 and receiving therefrom an access signal which opens hatch 100 (FIG. 8). After docking is successfully completed, cargo 108 is delivered through open hatch 100 (FIG. 8). The unmanned aircraft 106 then undocks from the container 10 and hatch door 100 closes and locks. In a particularly preferred embodiment of the invention, the ordered goods are deposited by the unmanned aircraft into that area of the SCLC to which the customer has direct access. This embodiment is highly advantageous over presently available systems wherein delivery is accomplished via unmanned aircraft, which require movement within the storage box of the goods deposited by the unmanned aircraft to an area which is accessible by the customer, thereby adding greatly to the cost and inefficiency thereof.

It will be understood by those skilled in the art that arty of the scheduling, signaling and communication techniques described herein may be employed in connection with any of the improved delivery systems and methods of the invention without departing from the spirit and scope thereof.

Although various specific constructions and steps have been shown and discussed, these are for illustrative purposes only. Various modifications will be apparent to those of skill in the art. Therefore, the scope of the present invention should be determined with reference to the claims appended hereto.

An additional embodiment of the invention is predicated on the unexpected discovery that the HV method and system is vastly improved where the locked storage container is monitored by a security camera associated therewith.

Figure 12:
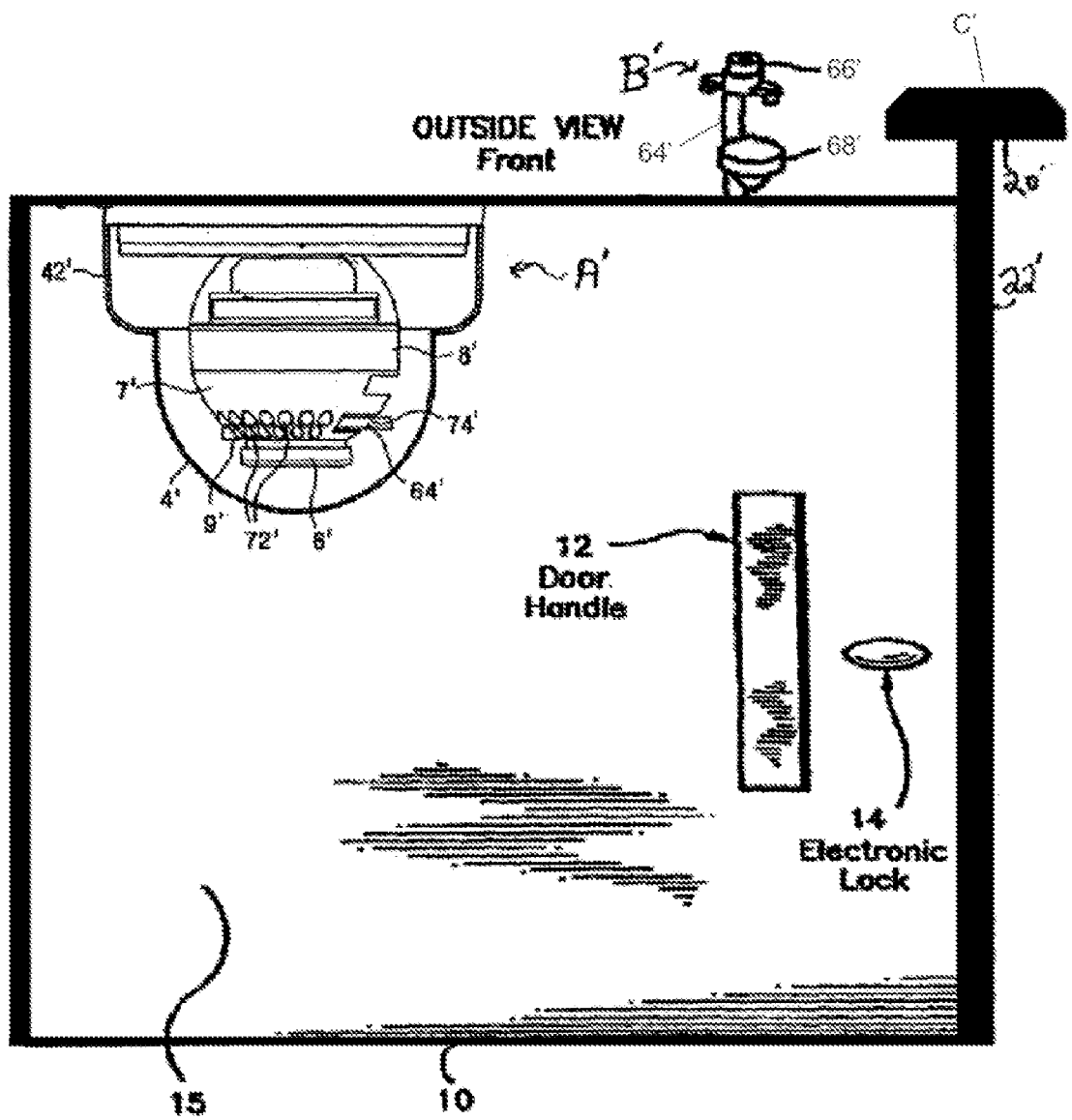
FIG. 12 is an elevational view of the front of a storage container showing security camera options.

FIG. 12 depicts the front of the storage container showing three types of security cameras associated therewith. It will be understood by those skilled in the art that either type of security camera, or any other suitable security camera, or any combination thereof may be employed in the practice of the invention.

As shown in FIG. 12, a suitable dome security camera A' includes a housing 2' for affixing the camera to the front of the storage container 10, a hemispherical cover 4', a camera module, and a bracket 8'. A circuit part (not shown) is installed in the housing 2'. The hemispherical cover 4' is coupled to the housing 2'. The camera module includes a casing 7' which has a lens 6' mounted to the central portion thereof, and has a plurality of IR LEDs 72' (hereinafter referred to as 'LED') around the lens 6'. The bracket 8' is provided in the housing 2' so that the casing 7' is rotatably coupled thereto. Further, the lens 6' is coupled to a barrel. The barrel is constructed so that the lens 6' is moved up and down by rotating a knob 64' provided on a side of the barrel, thus adjusting a focus. The knob 64' passes through an actuating hole 74' formed in the casing 7' in such a way as to be exposed to the outside. Further, a sensor 9' for detecting the movement of a subject is embedded in a portion which is opposite the knob 64'.

Also, as shown in FIG. 12, an alternative type of security system B' may be affixed to the storage container. Pole 64' may be installed at the front edge of the container 10, to which may be affixed a light 66' and a security camera 68'. Optionally, security system B' can be installed in the interior of the storage container as depicted in FIG. 5 to enable monitoring activity inside the storage container FIG. 12 also illustrates a further embodiment of the invention wherein security camera C' is not affixed physically attached to the storage camera but is situated remote therefrom at a distance and location that enables secure monitoring of the storage container.

It wilt be understood by those skilled in the art that the particular location of the security camera/system, whether inside the storage container or outside thereof is only critical to the extent that it enables the desired degree of monitoring of the activity in and around the latter.

The method and system of the invention utilize a processor implemented system programmed in a non-transitory, computer-readable medium, the system comprising at least one server processor, such as a computer, enabled to operate at least one security camera, wherein the security camera is affixed to the storage container. The computer may be configured to control the security camera situated at the storage bin(s). The security camera may be configured to detect when a delivery agent leaves, or optionally, the security camera may simply take one or a number of pictures during the interaction. The security camera collects digital color high-resolution images that are recorded within the computer to further enable a remote authorized and authenticated user to monitor the interior and exterior of the storage bins in real time and in time-late modes.

The system preferably may include strategically positioned high-resolution digital cameras, the controls of which may include, for example, pointing, zooming, panning, field of view, field of regard, lighting, etc. The imagery collected by each camera is stored within the computer system and is available for review, file transfer, and processing. The system may be configured to record continuous or time-lapsed frames.

Figure 13:
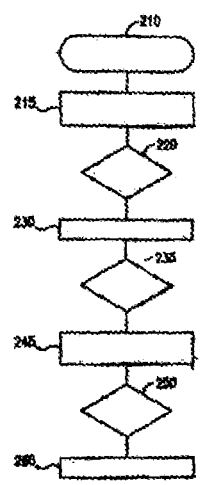
FIG. 13 is a flowsheet demonstrating an embodiment of the method and system of the invention

FIG. 13 shows a typical flowchart of a further embodiment of the invention. A securitization method and system may be integrated with the server processor/computer to further securitize the delivery. A user interface 210 which communicates with the server processor further communicates with a screen 215 which may display a message such as "touch to begin," When the user touches the screen, the flow proceeds to the main menu screen 220. The system may allow for the user to enter a code at 230. If entry of the code is successful the code will be validated at 235, and the location of the package in the system is determined at 245. Optionally, the system may include a request for additional pre-approved identification of the user at 250. Upon satisfaction of the request, the storage container is allowed to be opened in accordance with the method and system described above.

An additional embodiment of the invention is predicated on the unexpected discovery that the HV method and system is vastly improved by associating the delivery with a program/platform which provides the deliveree with discounts, incentives, rewards and other advantages based on the loyalties of the deliveree.

Figure 14:
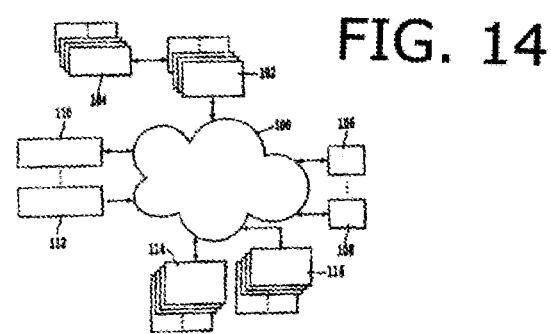
FIG. 14 illustrates an exemplary topology using a network.

FIG. 14 illustrates an environment for implementing the incentive rewards program. The environment may include a network 100 such as, for example, the Internet, a local area network (LAN), a wide area network (WAN), and the like. At least one server 102, connected to one or more databases 104, communicates with the network 100, and hosts the site for a vendor to manage the incentive rewards program; i.e., a system run by the vendor functions on the servers 102, and operates the incentive rewards program. It will be understood by those skilled in the art that the method and system of the invention are not limited to scenarios that only consider loyalty of a customer to a vendor of goods/items to the locked storage containers. For example, the entity which provides the deliveree with access to the network might also offer incentives, such as, for example, a reduction in monthly subscription fees based on the volume of deliveries to a particular deliveree's locked storage container.

The system also includes computers 106 and 108 and mobile devices 110 and 112. Customers, utilizing the PCs 108 and 108 and/or mobile devices 110 and 112 access the incentive rewards program on the seniors 102 via network 100. Accordingly, the servers 102 notify customers of the incentive rewards program through the network 100 to the PCs and/or mobile devices. One or more vendors 114 or 116 may access the server 102 via network 100.

The system associated with the above-described delivery methods and systems that, for example, provides customers of the provider with discounts, incentives, rewards and other advantages based on the loyalty of the customer to the provider preferably comprises at least one server which, in turn, comprises one or more linked databases for storing customer data associated with a loyalty program of the provider. The customer data includes, but is not limited to the purchase history of the customer. The system also comprises a processor configured to analyze the customer data and determine a suitable discount, reward or other incentive to be provided to the customer. The processor is further configured to redeem the discount, reward or other incentive provided to the customer upon receiving a purchase request or order therefrom.

Figure 15:
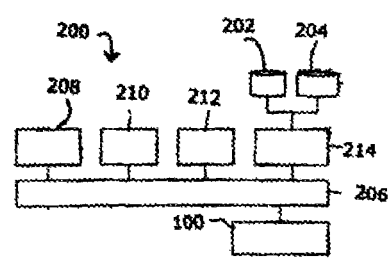
FIG. 15 is a block diagram exemplifying an embodiment of the topology of FIG. 14, FIG. 16

FIG. 15 is an exemplary block diagram of a subsystem 200 that may be utilized to implement the delivery method and system. According to some embodiments, one or more subsystems 200 operating in parallel with each other may be utilized to implement the delivery method and system.

In the exemplary embodiment shown in FIG. 15, the subsystem 200 includes a non-transitory computer readable medium 202, having stored thereon computer executable instructions, which may be read by processor 204. The instructions, when executed by the processor causes the at least one server 206 to store the instructions in the one or more linked customer databases 208, 210, 212, and 214. These instructions relate to customer data, which include, but are not limited to the purchase histories of the customer. The at least one server also communicates with network interface 100 [FIG. 8] to notify customers of awarded discounts, incentives, and the like upon receiving a purchase request or order therefrom, and redeem them when desired by the customer.

As noted above, the method and system of the invention are associated with a non-transitory computer readable medium 202 having stored thereon computer executable instructions that when executed by processor 204 in the individualized discount and reward server 206 results in the storage of customer loyalty, such as, for example, purchase history and the like, determine and allocate at least one customized reward/incentive to the loyalty customer and also results in the redemption of the reward/incentive, if desired and requested by the customer, as well as delivery of the purchased/ordered items/goods.

Those skilled in the art will be aware that the incentive rewards program may take any convenient form, tailored to the nature of both the vendor's and customer's needs. For example, the program may be designed to offer benefits to loyal customers, such as discounts, coupons, rebates, free products, awards, prizes, extended warranties, insurance and amenities, as well as other purchasing incentives.

A further embodiment of the invention is predicated on the unexpected discovery that the HV method and system is significantly improved where delivery to the locked storage container comprises a system and method for robotic delivery with a driverless vehicle.

More particularly, this aspect of the invention comprises a processing device capable of (1) receiving a purchase order of at least one element, (goods) from a client/customer/buyer, (2) computing itinerary information to the locked storage containers, which are accessible by means of an identifier which unlocks an entry door to the interior of the locked storage container, (3) transmitting the purchase order to a robotic positioner, which is capable of placing the ordered goods into a driverless vehicle, and (4) transmitting the order and itinerary information to the driverless vehicle, which is capable of conveying the ordered goods to the locked storage containers, unlocking the storage containers, robotically depositing the ordered goods into the storage containers, and relocking the storage containers.

The improvement of the patented system and method by utilizing the driverless vehicle and robotic delivery system of the present invention provides many significant advantages.

In the United States alone, more than 30,000 people die in traffic-related deaths every year, whereas driverless delivery vehicles would drastically reduce the number of accidents helping to save thousands of lives. Moreover, driverless vehicles have a great potential in efficiency in terms of better traffic flow, and also less fuel consumption. They will also reduce carbon emissions by as much as 300 million tons per year. The driverless vehicle may take many forms, including those powered by an internal combustion engine, electric engine or hybrid thereof. The vehicle may be a cargo van, minivan, pickup truck, panel van, platform truck, flatbed truck, refrigerated truck, tank truck, semi-trailer truck, or automobile. It will be understood by those skilled in the art that any conventional driverless platform may be utilized in the delivery vehicle for the practice of the present invention, such as, for example, the Google® car.

Preferably, the driverless vehicle is equipped with a Global Positioning System to provide location data associated with a location of the driverless vehicle. The location data may be processed based on the itinerary information transmitted thereto by the processor and, based on the comparison, instructions on travel distance and travel direction associated with a destination may be adjusted.

The driverless vehicle is preferably equipped with the robotic positioner; however, those skilled in the art will appreciate that the invention includes an embodiment wherein the origin of the ordered goods and the destination storage container(s) are also equipped with their own robotic positioner The driverless vehicle may receive the itinerary information from the processor and/or robotic positioner. To store the itinerary information, the driverless vehicle may include a memory unit. The memory unit may include an external hard drive, CD, DVD, and so forth. Additionally, the driverless vehicle may include its own processor to execute itinerary instructions.

The robotic positioner may be equipped with one or more arms configured to grasp the goods and place the goods on or in the driverless vehicle. The robot may be configured to pour an ordered amount of the goods into the driverless vehicle. In other embodiments, the robot may include a conveyor configured to move goods into the driverless vehicle.

Figure 16:
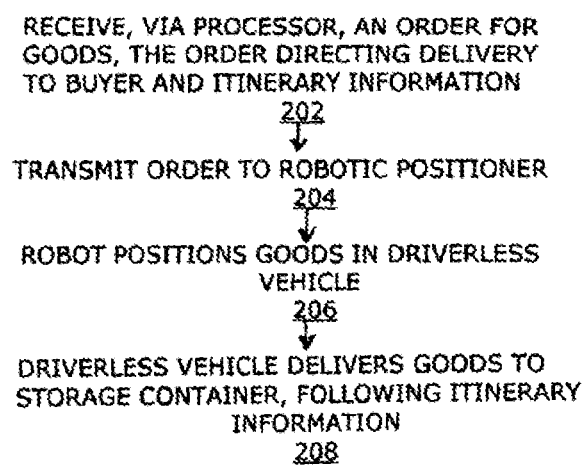

FIG. 16 illustrates is a flow chart illustrating a method 400 for automated delivery, in accordance with a preferred embodiment of the invention. Method 400 starts with a receiving, at operation 402, of an order from a purchaser. The order may specify one or more goods to be delivered to the purchaser and/or itinerary information. The order is received by a processor and transmitted by the processor to a robotic positioner and a driverless delivery vehicle at operation 404. At operation 406, the robotic positioner places the goods on or in the driverless delivery vehicle. The driverless delivery vehicle then transports the goods to the locked storage containers at operation 408, using the itinerary information transmitted thereto.

Figure 17:
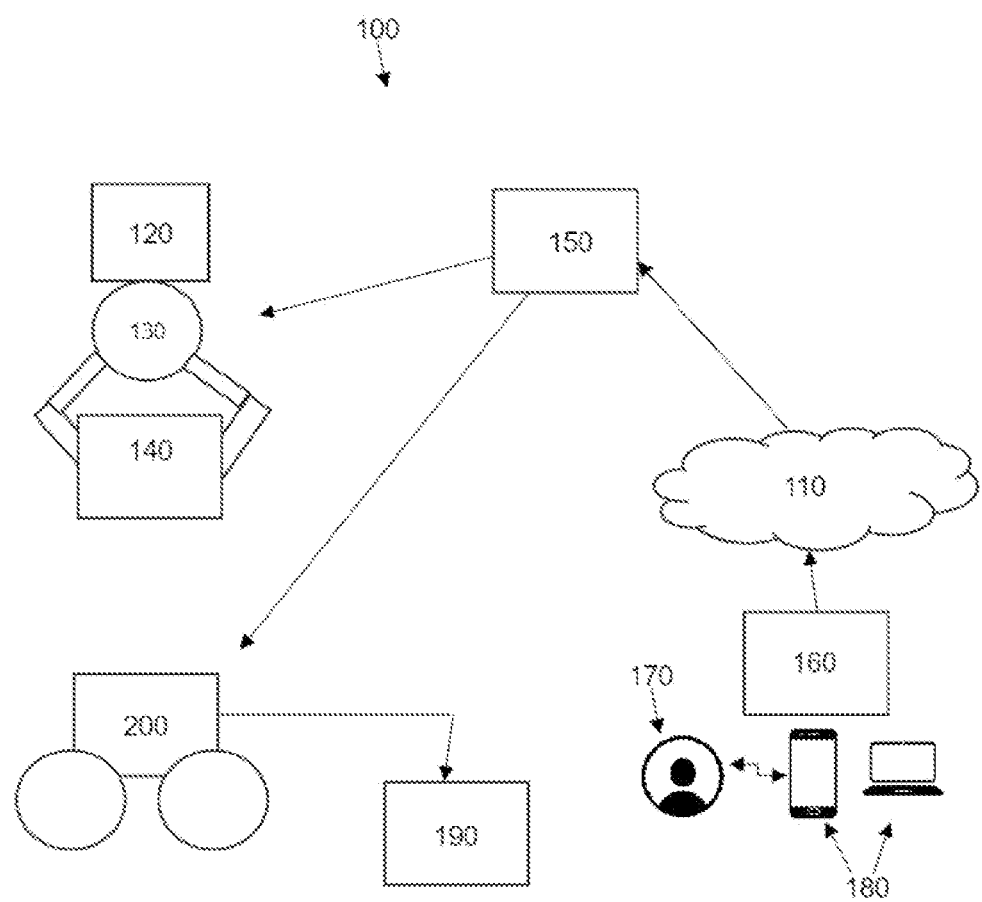
FIG. 17 illustrates is a flow chart illustrating a method for automated, robotic delivery, in accordance to certain example embodiments.

FIG. 17 illustrates an environment 100 within which a driverless delivery vehicle 200, systems and methods for automated delivery using the driverless delivery vehicle 200 can be implemented. The environment 100 may include a network 110, the driverless delivery vehicle 200, a source of goods 120, a robotic positioner 130, goods 140, a processing device 150, a buyer 170, one or more client devices 180, an order 160, and storage container 190.

The purchaser 170, using the one or more client devices 180 sends an order 160 to the processor 150. The one or more client devices 180 may include a mobile phone, a smartphone, a tablet PC, a lap top, a personal computer, and so forth. The one or more client devices 180 may communicate with the processing device 150 via the network 110 wirelessly or by wires using various connections.

The order 160 may include information on one or more goods 140 the buyer wants to be delivered to the storage containers 190 and itinerary information associated with the destination 190. The itinerary information may include instructions on travel distance and travel direction associated with destination 190. The order 160 is transmitted via network 110 to the processor 150. The processor 150 may include a server, a computing device, and so forth. The processor 150 may optionally process the order 160 to extract information to be transmitted to the robotic positioner 130 anchor the driverless delivery vehicle 200. Optionally, the processor 150 may store the order 160 to a database.

The order 160 may be transmitted to the robotic positioner 130 or driverless vehicle 200. As noted above a robotic positioner may be located in both the driverless vehicle 200 and source of goods 120 and/or destination 190. The robotic positioner 130 picks up the goods 140 based on the order 160. In another embodiment, the order 160 may be transmitted directly to the driverless vehicle 200, which may then travel to the source of goods 120 and transmit a command to a robotic positioner provided on the vehicle to deposit the goods thereon.

The driverless vehicle 200 will then transport the goods 140 to the delivery destination 190 based on the order 160 and itinerary information, such as instructions on travel distance and travel direction associated with the destination 190.

Figure 18:
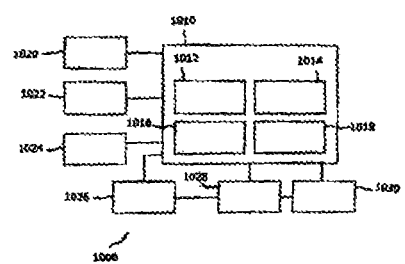
FIG. 18 is a block diagram depicting a system, in accordance with certain example embodiments.

FIG. 18 illustrates a preferred command system 1000 for directing the robotic positioning of the ordered goods (OG) on the driverless delivery vehicle (DDV), directing the DDV to the location of the locked storage containers (LSC) and directing the robotic transfer of the OG to the LSC, depicted in FIG. 10, is controlled by computer 1010, which may include elements such as an imaging regulator 1012, a tracking regulator 1014, a robotic tool regulator 1016, and an overall system regulator 1018. The computer 1010 may, of course, comprise CPU's dedicated for each operation or group of operations, or an individual CPU which handles all of the operations within a centralized control system.

Preferably connected to the computer 1010 are an electronic display 1022, a user interaction element 1024 (an interface device: e.g., a keyboard, a mouse, a touchpad, a motion gesture sensor, a microphone for voice recognition, or an imaging device) and a memory 1020. The supporting software is stored in the memory 1020 and is run by the computer 1010. The robotic positioning and transfer tool 1030 is also connected to the computer 1010 for receiving movement command signals. Also connected to and communicating with the computer 1010 are an imaging system 1028 and a tracking system 1026.

The imaging regulator 1012 generates virtual images of the robotic OG positioning and transfer work spaces at the location of the OG and on the DDV, respectively, and enables an operator (not shown) to manipulate the images and manually operate robotic positioning and transfer tool 1030 at any point during the delivery operation, it will be understood by those skilled in the art, however, that the robotic transfer and positioning operations may be conducted automatically by the computer 1010.

The imaging system 1028 is used to generate a digital model of the OG positioning and transfer areas and display the digital model as a virtual image on the electronic display 1022 and communicate it to the other computer controlled devices such as the robotic positioning and transfer tool 1030. The imaging system 1028 may also include cameras mounted on the tool that monitor the work areas during the various operations during the delivery process and aid in guiding the robotic tool 1030 in response to movements detected during the procedure.

The tracking system 1026 tracks the OG dynamically in real time with complete information about its location, orientation, and other physical parameters.

Those skilled in the art will recognize that any suitable robotic tool may be employed in the practice of the invention, provided that is capable of grasping, transferring and positioning OG to and from the origin of OG, the DDV and the LSC. Typically such tools comprise a guidance system and a drive subsystem therefore, an obstacle detection element, and other typical elements for controlling robotic tools. The robotic tool may be operated manually, or automatically by the computer 1010 to perform various functions, including transferring OG from the point of origin to the DDV, and from the DDV to the LSC.

The system 1000 functions like any conventional computer system, an embedded controller, a laptop, a server, a mobile device, a smartphone, a set-top box, a kiosk, a vehicular information system, one or more processors associated with a television, a customized machine, any other hardware platform, or any combination thereof. The system 1000 may be distributed for operation employing multiple computers interconnected via a data network or bus system.

The computer 1010 executes code or instructions to perform the required operations and functions described herein, address mappings, and perform any necessary calculations and generate commands required to achieve optimum deliveries. The computer 1010 monitors and controls the operation of the components of the system 1000 and may comprise any general purpose processor, processor core, multiprocessor, reconfigurable processor, microcontroller, digital signal processor (DSP), application specific integrated circuit (ASIC), graphics processing unit (GPU), field programmable gate array (FPGA), programmable logic device (PLD), controller, state machine, gated logic, discrete hardware components, any other processing unit, or any combination thereof. The computer 1010 may consist of a single processor, multiple processors, single processor core, multiple processor cores, special purpose processor cores, co-processors, or any combination thereof, and may, along with other components of the system 1000 be a virtualized computer capable of executing within one or more other computers.

The memory 1020 includes non-volatile memories, for example, read-only memory (ROM), programmable read-only memory (PROM), erasable programmable read-only memory (EPROM), flash memory, or any other device capable of storing program instructions or data with or without applied power. The memory 1020 also may include volatile memories, for example, random access memory (RAM), static random access memory (SRAM), dynamic random access memory (DRAM), and synchronous dynamic random access memory (SDRAM). Other types of RAM also may be utilized in the memory 1020. The memory 1020 operates utilizing a single memory module or multiple memory modules. The memory 1020 is depicted as part of the system 1000; however, one skilled in the art will recognize that the memory 1030 may be separate from the system 1000 without departing from the scope of the invention, it will also be appreciated that the memory 1020 may include, or operate in conjunction with, a non-volatile storage device.

The system 1000 may function in a networked environment using logical connections to one or more other systems or computers across a network. The network may include wide area networks (WAN), local area networks (LAN), intranets, the Internet, wireless access networks, wired networks, mobile networks, telephone networks, optical networks, or combinations thereof. The network may be packet switched, circuit switched, of any topology, and use any communication protocol. Communication links within the network may involve various digital or an analog communication media, for example, fiber optic cables, free-space optics, waveguides, electrical conductors, wireless links, antennas, radio-frequency communications, and the like.

A still further embodiment of the invention is predicated on the unexpected discovery that the HV method and system is significantly enhanced where the locked storage appliance is part of a system of "smart" interlocking locked storage appliances.

The term, "smart", as used herein in connection with locked storage appliances, is refers to an electronic device in each appliance generally connected to each other and to networks via different wireless protocols such as Bluetooth, NFC, Wi-Fi, 3G, etc., that can operate to at least some extent interactively and autonomously. The term also refer to a device that exhibits some properties of ubiquitous computing, including, but not limited to, artificial intelligence.

Figure 19:
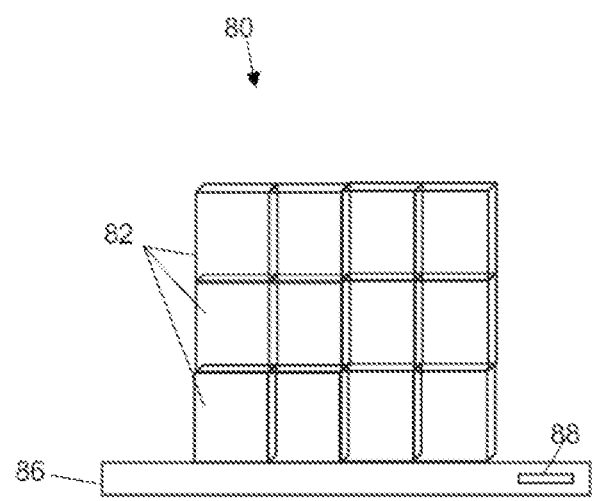
FIG. 19 is a perspective front view of a system comprising a single file of interlocking smart locked storage appliances.

The method and system of the invention allow access to at least one of the locked smart storage appliance in the system of interlocking smart storage appliance at fixed sites/locations/addresses by means of a specific identifier which only unlocks the entry door to the interior of a particular, pre-identified locked smart storage container, FIG. 19 illustrates an embodiment of a system 80 of interlocking smart locked storage appliances 82 according to the invention.

The interlocking mechanism (shown in FIG. 23) would allow for a variety of smart locked storage appliances 82 to be interlocked together. The smart locked storage containers are stacked and locked onto the top 84 of a base 86 which contains at least one element 88 which may provide electrical power, internet connectivity, and the like to each and/or all of the locked smart storage appliances. These functions would allow the locked smart storage appliance to provide heating, cooling, inventory and scheduling management, delivery notifications, and access control.

The base 86 that the locked smart storage appliances 82 would lock into may be in constant connection with any part of the system via ethernet or wireless connectivity protocol (WIFI, Cellular, etc). The locked smart storage appliances 82 would register themselves with the base and communicate to the deliveree's account that the purchased or ordered items had been delivered.

The deliveree could also be informed about the contents of the locked smart storage appliance 82. Upon delivery, the contents of the locked smart storage appliance would be registered via element 88 with the base 86 from which it would be communicated to a central inventory management and logistics database. Once entered, the locked smart storage appliance contents would be available for viewing by the intended deliveree in their account.

The base 86 may have electronic connectors (not shown) on the bottom, top or sides thereof to allow for the stacked, interconnected and locked smart storage containers 82 to be provided power and Internet connectivity via element 88. Alternatively, wireless protocols such as Bluetooth, WIFI, NFC, RFID, or other wireless protocols could be used for internet connectivity or simple data transfer while power could be supplied by physical connection between the interconnected smart locked storage containers.

The locked smart storage appliances, themselves, could, according to the invention, be delivered by an agent, driverless vehicle, drone, or other delivery means to any desired location for future deliveries of ordered items.

Another embodiment of the invention relates to a locked smart storage appliance base 86 that may be permanently affixed at a secure location. It is an advantageous feature of the invention that the smart locked storage containers delivery containers 82 may be easily connected with or removed from base 86 or interchanged with other containers 82.

Figure 20:
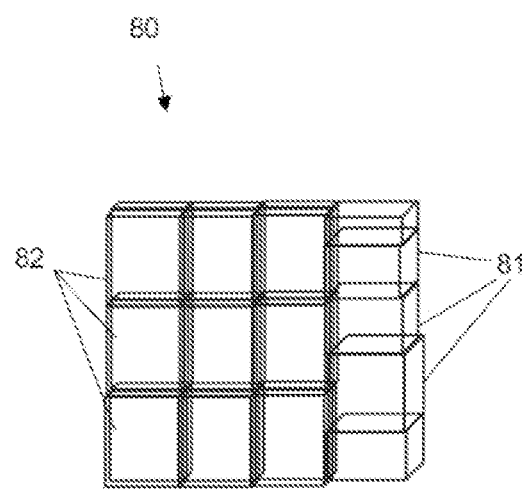
FIG. 20 is a perspective front view of a system comprising a plurality of files of interlocking smart locked storage appliances.

FIG. 20 illustrates an embodiment of a system 80 comprising multiple files or rows 81 of interlocking smart locked storage appliances 82 of differing sizes.

Figure 21:
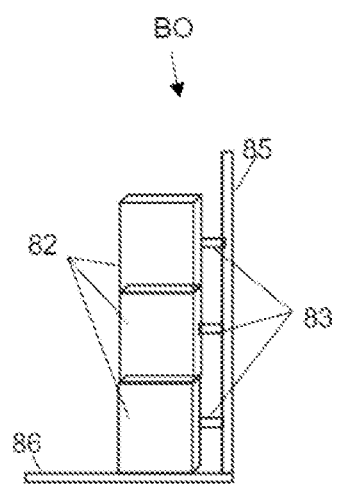
FIG. 21 is a perspective side view of a system comprising a single file of interlocking smart locked storage appliances.

FIG. 21 illustrates an embodiment of a system BO showing the locked storage containers 82 affixed to base 86 and interconnected with each other via locking mechanisms 83 which are connected to stabilizing rack 85.

A final embodiment of the present invention is predicated on the unexpected discovery that the HV method and system is improved where delivery to the SLSC is managed by a system, method or platform wherein the delivery agent is selected from a group consisting of bidders in an auction of the delivery of the ordered item.

Figure 22:
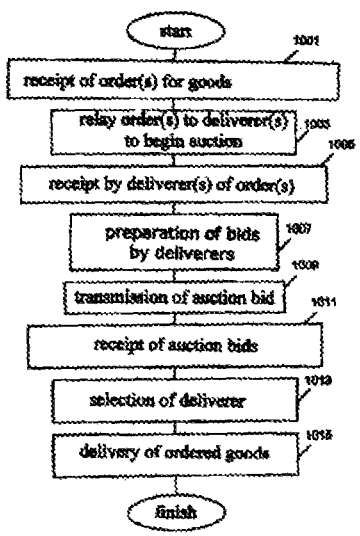
FIG. 22 is a block diagram depicting an auction system, in accordance with certain example embodiments.

FIG. 22 is a block diagram of some preferred aspects of the method and system of the present invention.

At block 1001, the order or purchase of the goods to be delivered to the locked storage container(s) is received. The order or purchase will include information as to the location of the container(s), preferred times of delivery of the goods thereto, and the like.

At block 1003, invitations to bid in an auction for delivery of the goods are conveyed to a pool of delivery agents. In a preferred embodiment, the invitations are transmitted by a computerized system through a website, and may take the form of an email, a text message, an electronic message, and the like. The invitations may take any desired or convenient form, listing all of the parameters to be considered for the delivery such as, for example, price of delivery range, nature and size of goods, time frame of delivery, deadline for submitting bids, and the like.

Block 1005 indicates receipt by the delivery agents of the invitations to bid. It will be apparent to those skilled in the art that the pool of delivery agents have ready access to the preferred website described above.

At block 1007, those delivery agents in the pool to which invitations were sent, prepare their bids based on considerations of the nature and cost of delivery, the time of delivery and their availability to make the delivery, and the like.

At block 1008, the delivery agents participating in the auction deliver their bids to the origin of the purchased or ordered goods.

Block 1011 indicates receipt by the origin of the purchased or ordered goods of the delivery agents' bids. In a preferred embodiment, the bids are received through a website. The bids will include information about costs, times and any other parameters set forth above in the description of block 1003 in the invitations to bid.

At block 1013, the originator of the bids selects the delivery agent at the end of the time period for bidding. The selection may be accomplished utilizing any convenient formula or algorithm suitable for such purposes. One of the critical factors in making the selection is the reputation and performance history of the delivery agent. Therefore, the method and system of the invention includes the collection of data from prior invitations, prior bids received from bidders, and prior performances of accepted bids and contracts by bidders, and the archiving of such data in a database on which the selection of delivery agent may be based.

As indicated at block 1015, delivery according to the improved system and method of the invention is effected by the selected bidder.

It will be recognized by those skilled in the art that any desired and suitable auction system may be employed in the practice of the invention. Exemplary, but not exhaustive of suitable systems are traditional, reverse, silent, secret, or open auctions. Preferably, the auction process is conducted on line.

Figure 23:
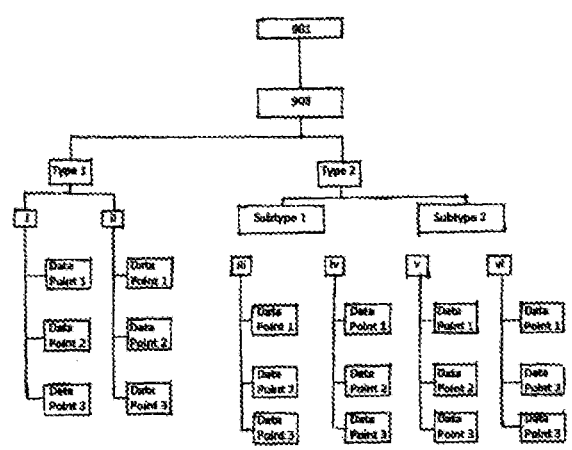
FIG. 23 is a block diagram depicting an exemplary collection of performance data histories for use in evaluating auction bids.

FIG. 23 illustrates the data format and structure of information 900 collected and maintained for evaluating bids from delivery agents participating in an auction conducted in accordance with an embodiment of the invention.

Information relating to prior auction bids and deliveries previously performed in accordance with the system and method of the invention by members i, ii, iii, iv, v, vi, vii, etc, of a pool 903 of delivery agents is stored in database 901. In accordance with a preferred embodiment of the invention, goods to be delivered are categorized as Type 1, Type 2, and so on. For example, the goods to be delivered could be typed as bulk liquids, solids, particulate matter, and the like. Those skilled in the art wilt appreciate that the system and method of the invention are amenable to any kind of characterization of the goods to be delivered.

In some cases, it may be desirable to further subdivide the Types into Subtypes 1, 2, etc. For example, a Type 2 solid could be Subtyped as refrigerated, and the like. It will be appreciated by those skilled in the art that any hierarchical system of classifying the kinds of deliveries and goods may be employed in the practice of the invention.

The past bids and aspects of the delivery performances of the various delivery agents, i, ii, iii, . . . are represented in FIG. 9 by Data Point 1, Data Point 2, Data Point 3, and so on. Data Point 1 may refer to bid price, for example. Data Point 2 may represent a grade for timeliness of delivery. Data Point 3 could indicate the satisfaction or lack thereof by the owner of the locked storage container to which the ordered or purchased goods were delivered. Those skilled in the art that be aware that the number and kinds of Data Points to be included in any embodiment of the invention is limited only by the imagination of the user thereof.

The historical data contained in database 901 is relied upon to evaluate those bidding in the auction conducted in the practice of the system and method of the invention in order to select the best possible option for delivery of the ordered or purchased goods.

A preferred embodiment of an auction system which comprises part of the improved system and method of delivery of ordered or purchased goods to locked storage containers comprising the present invention is illustrated in FIG. 10.

Figure 24:
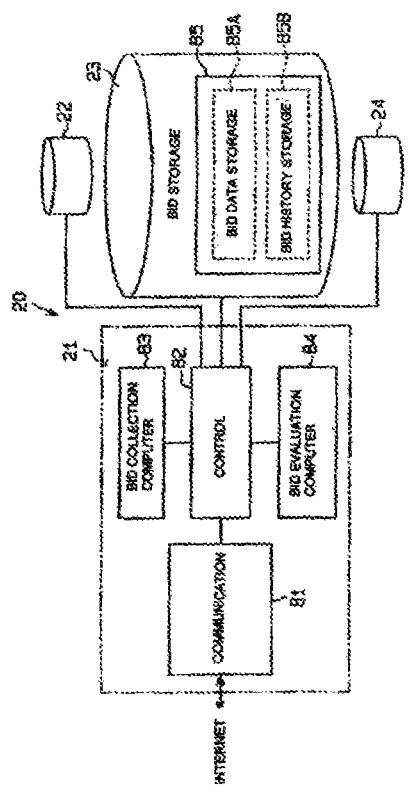
FIG. 24 is a block diagram depicting an exemplary auction.

As illustrated in FIG. 24 a preferred auction system 20 comprises a server 21, which is connected to three databases 22, 23, and 24, and to the Internet. and further connected to terminals (not shown) of members of a pool of potential delivery agents, for communications therewith through the Internet.

The server 21 illustrated in FIG. 26 stores an auction program which communicates to members of the pool of delivery agents through the Internet or other electronic means invitations to bid in an auction. The respective members of the pool prepare their bids and communicate the bids to the server 21

As further illustrated in FIG. 26, the auction system 20 comprises a communication element 81, a control element 82, a bid collection computing element 83, and a bid evaluation computing element 84. The communication element 81, control element 82, bid collection computing element 83 and bid evaluation computing element 84 are implemented by the server 21 in a preferred embodiment of the invention, the communication element 81 functions according to a predetermined communication protocol; e.g., (HTTP). A storage system 23, comprising a bid storage element 85 which is further comprised of a bid data storage element 85A and a bid history storage element 858. The control element 82 and the respective computing elements 83 and 84 are employed for computing a successful bidder in the auction from the data stored in the respective storage elements 86A and 858.

It will be understood by those skilled in the art that any of the scheduling, signaling and communication techniques described above may be employed in connection with the improved delivery system and method of the invention without departing from the spirit and scope thereof.

Although various specific constructions and steps have been shown and discussed, these are for illustrative purposes only. Various modifications will be apparent to those of skill in the art. Therefore, the scope of the present invention should be determined with reference to the claims appended hereto.

What is claimed is:

1. A system for managing the order, purchase and/or delivery of goods from a provider thereof to at least one smart locked storage container (SLSC), each SLSC respectively associated with a respective customer, the system comprising:
    a customer server for purchasing, ordering and/or managing the goods to be delivered to the at least one SLSC;
    a delivery server for managing deliveries of the goods to the at least one SLSC by a delivery agent;
    a scheduler for determining the availability of the at least one SLSC to receive said goods and a time for said delivery;
    a smart communicator for enabling communications between the provider of goods, the delivery server, the scheduler, a signaler and/or the customer server;
    a controller for controlling the communications;
    a signaler communicatively connected to the at least one SLSC for transmitting a signal to the at least one SLSC allowing access thereinto by the delivery agent, the customer, and/or an agent of the customer, and
    at least one of:
        a system comprising at least one server processor enabled to conduct a transaction between the server and customer for the purchase, order, and/or delivery of goods to the at least one SLSC as part of an automated mobile transaction performed with a mobile device,
        the delivery agent is an unmanned delivery aircraft,
        at least one security camera associated with said at least one SLSC,
        a delivery associated system which provides the deliveree with discounts, incentives, rewards and other advantages based on the loyalties of the deliveree,
        a robotic positioner of the goods with a driverless delivery vehicle agent, or
        a system comprising an element for preparing invitations to bid for the delivery of goods to the at least one SLSC; distributing, receiving, and evaluating the bids from a pool of delivery agents in an auction; and selecting a delivery agent,
    wherein the at least one smart storage container is positioned to communicate with a base that comprises at least one element capable of electronic communication with the at least one smart storage container.

2. A computer readable non-transitory recording medium having a program stored thereon which is executable by at least one processor to operate the system of claim 1.

3. The system of claim 1 wherein said signal allows access to said locked storage container upon said drone aircraft docking therewith.

4. The system of claim 1 further including: following said ordering, determining the site of said delivery and checking available room therefore in said at least one locked storage container.

5. The system of claim 1 wherein the security camera is associated with a processor-implemented system programmed in a non-transitory computer readable medium, the system comprising at least one server processor enabled to operate the at least one security camera.

6. The system of claim 1 wherein the security camera is physically attached to the at least one storage container.

7. The system of claim 1 wherein the security camera is located remotely from the at least one storage container.

8. The system of claim 1 wherein the processor implemented system is also enabled to securitize the delivery by requiring the delivery agent and or the customer to supply a preapproved identification code that permits access to the at least one locked storage container.

9. The system of claim 1 wherein the at least one security camera is associated with the at least one storage container such that the interior of the at least one storage container may be monitored thereby.

10. The system of claim 1 including at least one server which comprises one or more linked databases for storing deliveree data, said server being associated with a program of loyalties of the deliveree to the system, the customer data including, but not limited to, the purchase history of said customer and a processor configured to analyze said deliveree data and determine a suitable discount reward or other incentive to be provided to said deliveree based thereon.

11. The system of claim 10 wherein said processor is further configured to redeem said discount, reward or other incentive provided to said deliveree upon employing said system for delivery.

12. The system of claim 11 further comprising a non-transitory computer readable medium having stored thereon computer executable instructions that when executed by the processor causes the at least one server to store, in said one or more linked databases, said deliveree data, including said purchase history, and redeem said discount, reward or other incentive provided to said deliveree upon receiving a purchase or order therefrom.

13. The system of claim 1 wherein delivery includes robotic positioning of the at least one ordered item in the driverless vehicle.

14. The system of claim 1 wherein delivery includes robotic positioning of the at least one ordered item in the at least one locked storage container.

15. The system of claim 1 wherein delivery includes robotic positioning of the at least one ordered Item in the driverless vehicle, and robotic positioning of the at least one ordered item in the at least one locked storage container.

16. The system of claim 1 wherein the driverless vehicle is equipped with a Global Positioning System adapted to establish an itinerary from the origin to the at least one locked storage container.

17. The system of claim 1 wherein the driverless vehicle is equipped with a robotic positioner.

18. The system of claim 1 wherein the origin of the ordered goods is equipped with a robotic positioner.

19. The system of claim 1 wherein the at least one locked storage container is equipped with a robotic positioner.

20. The system of claim 1 wherein the driverless vehicle is capable of receiving the location of and driving to the storage container.

21. The system of claim 1 wherein the driverless vehicle includes a memory unit adapted to store the itinerary.

22. The system of claim 21 wherein the driverless vehicle includes a processor to execute the itinerary.

23. The system of claim 1 wherein the driverless vehicle is powered by an internal combustion engine, electric engine or hybrid thereof.

24. The system of claim 1 wherein the driverless vehicle is a cargo van, minivan, pickup truck, panel van, platform truck, flatbed truck, refrigerated truck, tank truck, and semi trailer truck, or automobile.

25. The system of claim 1 wherein a plurality of smart storage appliances are positioned on top of the base.

26. The system of claim 1 wherein said electronic communication enables the provision of electrical power or internet connectivity to said at least one smart storage container.

27. The system of claim 26 wherein at least one SLSC comprises at least one element enabled by said electrical power to provide a function selected from the group consisting of heating, cooling, inventory, scheduling management, delivery notifications, access control and any combination thereof.

28. The system of claim 27 wherein said electronic communication comprises a wireless protocol.

29. The system of claim 1 wherein said at least one smart storage container comprises a plurality of SLSCs interconnected together either vertically, horizontally, or both vertically and horizontally.

30. The system of claim 1 wherein the auction comprises:
submitting invitations to a pool of potential delivery agents to bid on delivering said at least one purchased or ordered item from said origin to said at least one locked storage container;
receiving bids from members of said pool to carry out said delivery;
evaluating said bids to determine the identity of the delivery agent selected to make said delivery;
selecting a delivery agent; and
transmitting authorization to said selected delivery agent to carry out said delivery.

31. The system of claim 30 conducted online.

32. The system of claim 31 wherein said evaluation of said bids is based on data collected from prior invitations, prior bids received from bidders, and prior performance of accepted bids and contracts by bidders.

33. The system of claim 32 wherein, during said delivery, the performance of said delivery agent is monitored and the data obtained therefrom added to said data collection.

34. The system of claim 1 wherein said auction comprises a traditional English auction, a reverse auction, a forward auction, a Yankee auction, a multiple-item Dutch auction, a Chinese auction, an absolute auction, a minimum-bid auction, a reserve auction, a first price-sealed-bid auction, a second-price-sealed-bid auction, a multi-par bidding auction, a silent auction, a secret auction, or an open auction.

35. The system of claim 1, including archiving and updating said collected data in a database.

36. The system of claim 35, wherein the steps of archiving and updating the database is performed automatically.

37. The system of claim 1 wherein said communications between the provider of goods, the delivery server, the scheduler, a signaler and/or the customer server comprises one of WiFi communication, near field communication (NFC), Bluetooth communication, or cellular communication.

38. A method for managing the sale, order, and/or delivery of goods ordered by a customer from a provider thereof to at least one smart locked storage container (SLSC), each SLSC respectively associated with a respective customer, the method comprising:

ordering, by a customer server, the goods to be delivered to the at least one SLSC;

managing deliveries, by a delivery server, of the ordered goods to the at least one SLSC by a delivery agent;

determining by a scheduler, the availability of the at least one SLSC to receive said goods and a time for said delivery;

enabling communications, by a smart communicator, between the provider of goods, the delivery server, the scheduler, a signaler and/or the customer server:

controlling, by a controller, the communications:

transmitting, by a signaler, a signal to the at least one SLSC allowing access thereinto by the delivery agent, the customer, and/or an agent of the customer, and at least one of:

conducting, by a system comprising at least one server processor, a transaction between the server and customer for the purchase, order, and/or delivery of goods to the at least one SLSC as part of an automated mobile transaction performed with a mobile device, using an unmanned delivery aircraft as the delivery agent, using at least one security camera associated with the at least one SLSC, providing, by a delivery associated system, the deliveree with discounts, incentives, rewards and other advantages based on the loyalties of the deliveree, using a robotic positioner of the goods with a driverless delivery vehicle agent, or using a system comprising an element for preparing invitations to bid for the delivery of goods to the at least one SLSC; distributing, receiving, and evaluating the bids from a pool of delivery agents in an auction; and selecting a delivery agent, wherein the at least one smart storage container is positioned to communicate with a base that comprises at least one element capable of electronic communication with the at least one smart storage container.

39. A computer readable non-transitory recording medium having a program stored thereon which is executable by at least one processor to perform the method of claim 38.

40. The method of claim 38 wherein said signal allows access to said at least one locked storage container upon said drone aircraft docking therewith.

41. The method of claim 38 further including: following said ordering, determining the size of said delivery and checking available room therefore in said at least one locked storage container.

42. The method of claim 38 wherein the security camera is associated with a processor-implemented system programmed in a non-transitory computer readable medium, the system comprising at least one server processor enabled to operate the at least one security camera.

43. The method of claim 38 wherein the security camera is physically attached to the at least one storage container.

44. The method of claim 38 wherein the security camera is located remotely from the at least one storage container.

45. The method of claim 38 wherein the processor implemented system is also enabled to securitize the delivery by requiring the delivery agent and or the customer to supply a pre-approved identification code that permits access to the at least one locked storage container.

46. The method of claim 38 wherein the at least one security camera is associated with the at least one storage container such that the Interior of the at least one storage container may be monitored thereby.

47. The method of claim 38 including at least one server which comprises one or more linked databases for storing deliveree data, said server being associated with a program or loyalties of the deliveree to the system, the customer data including, but not limited to, the purchase history of said customer and a processor configured to analyze said deliveree data and determine a suitable discount, reward or other incentive to be provided to said deliveree based thereon.

48. The method of claim 38 wherein said processor is further configured to redeem said discount, reward or other incentive provided to said deliveree upon employing said system for delivery.

49. The method of claim 48 further comprising a non-transitory computer readable medium having stored thereon computer executable instructions that when executed by the processor causes the at least one server to store, in said one or more linked databases, said deliveree data, including said purchase history and redeem said discount, reward or other incentive provided to said deliveree upon receiving a purchase or order therefrom.

50. A non-transitory computer readable medium storing computer executable instructions thereon configured to cause a processor and server to perform the method of claim 38, and further performs the storage of a deliveree's loyalty data when employing said system and then determines and allocates to the deliveree at least one customized reward/incentive and, if desired and requested by the deliveree, also thereby results in the redemption of the reward/incentive, upon the deliveree.

51. The method of claim 38 wherein delivery includes robotic positioning of the at least one ordered item in the driverless vehicle.

52. The method of claim 38 wherein delivery includes robotic positioning of the at least one ordered item in the at least one locked storage container.

53. The method of claim 38 wherein delivery includes robotic positioning of the at least one ordered item in the driverless vehicle and robotic positioning of the at least one ordered item in the at least one locked storage container.

54. The method of claim 38 wherein the driverless vehicle is equipped with a Global Positioning System adapted to establish an itinerary from the origin to the at least one locked storage container.

55. The method of claim 38 wherein the driverless vehicle is equipped with a robotic positioner.

56. The method of claim 38 wherein the origin of the ordered goods is equipped with a robotic positioner.

57. The method of claim 38 wherein the at least one locked storage container is equipped with a robotic positioner.

58. The method of claim 38 wherein the driverless vehicle is capable of receiving the location of and driving to the at least one locked storage container.

59. The method of claim 38 wherein the driverless vehicle includes a memory unit adapted to store the itinerary.

60. The method of claim 59 wherein the driverless vehicle includes a processor to execute the itinerary.

61. The method of claim 38 wherein the driverless vehicle is powered by an internal combustion engine, electric engine or hybrid thereof.

62. The method of claim 38 wherein the driverless vehicle is a cargo van, minivan, pickup truck, panel van, platform truck, flatbed truck, refrigerated truck, tank truck, and semi-trailer truck, or automobile.

63. The method of claim 38 wherein a plurality of smart storage appliances are positioned on top of the base.

64. The method of claim 38 wherein said electronic communication enables the provision of electrical power or internet connectivity to said at least one of said smart storage container.

65. The method of claim 64 wherein at least one SLSC comprises at least one element enabled by said electrical power to provide a function selected from the group consisting of heating, cooling, inventory, scheduling management, delivery notifications, access control and any combination thereof.

66. The method of claim 65 wherein said electronic communication comprises a wireless protocol.

67. The method of claim 38 wherein said at least one smart storage container are interconnected together either vertically, horizontally, or both.

68. The method of claim 38 wherein the auction comprises:
submitting invitations to a pool of potential delivery agents to bid on delivering said at least one purchased or ordered item from said origin to said at least one locked storage container;
receiving bids from members of said pool to carry out said delivery;
evaluating said bids to determine the identity of the delivery agent selected to make said delivery:
selecting a delivery agent; and
transmitting authorization to said selected delivery agent to carry out said delivery.

69. The method of claim 68 conducted on line.

70. The method of claim 69 wherein said evaluation of said bias is based on data collected from prior invitations, prior bids received from bidders and prior performance of accepted bids and contracts by bidders.

71. The method of claim 70 wherein, during said delivery, the performance of said delivery agent is monitored and the data obtained therefrom added to said data collection.

72. The method of claim 71 wherein said auction comprises a traditional English auction, a reverse auction, a forward auction, a Yankee auction, a multiple-item Dutch auction, a Chinese auction, an absolute auction, a minimum-bid auction, a reserve auction, a first price-sealed-bid auction, a secondprice-sealed-bid auction, a multi-par bidding auction, a silent auction, a secret auction, or an open auction.

73. The method of claim 38, including archiving and updating said collected data in a database.

74. The method of claim 73, wherein the steps of archiving and updating the database is performed automatically.

75. The method of claim 38 wherein said communications between the provider of goods, the delivery server, the scheduler, a signaler and/or the customer server comprises one of WiFi communication, near field communication (NFC), Bluetooth communication, or cellular communication.

* * * * *